(12) United States Patent
Azuma et al.

(10) Patent No.: US 7,497,783 B2
(45) Date of Patent: Mar. 3, 2009

(54) PROPELLER SHAFT

(75) Inventors: Hitoshi Azuma, Aichi-ken (JP);
Shinichi Takeuchi, Toyota (JP); Hiroaki Tashiro, Toyota (JP); Takeo Yamamoto, Nisshin (JP); Yoshinori Ozaki, Toyota (JP); Yoshio Fuwa, Toyota (JP); Masaaki Ogawa, Aichi-ken (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 47 days.

(21) Appl. No.: 11/645,728

(22) Filed: Dec. 27, 2006

(65) Prior Publication Data
US 2007/0149299 A1 Jun. 28, 2007

(30) Foreign Application Priority Data
Dec. 28, 2005 (JP) ............................. 2005-379125

(51) Int. Cl.
*F16D 3/06* (2006.01)

(52) U.S. Cl. ........................................ 464/162; 464/75
(58) Field of Classification Search ................. 464/162, 464/75
See application file for complete search history.

(56) References Cited

U.S. PATENT DOCUMENTS

| 5,985,451 A | * | 11/1999 | Senda et al. ................. 428/408 |
| 2003/0217904 A1 | * | 11/2003 | Ando et al. ............. 192/107 M |

FOREIGN PATENT DOCUMENTS

| JP | 8-109918 A | 4/1996 |
| JP | 9-105419 A | 4/1997 |
| JP | 2000-337395 A | 12/2000 |
| JP | 2005-98495 A | 4/2005 |

* cited by examiner

*Primary Examiner*—Aaron M Dunwoody
(74) *Attorney, Agent, or Firm*—Sughrue Mion, PLLC

(57) ABSTRACT

A propeller shaft having high wear resistance is provided. The propeller shaft has a spline shaft and a spline sleeve meshing with each other, and a DLC coating is applied to any one of the spline shaft and the spline sleeve. The DLC coating has surface roughness Ra of 0.5 μm or smaller.

10 Claims, 4 Drawing Sheets

| SAMPLE No. | 1 | 2 | 3 | 4 | 5 | 6 | 7 |
|---|---|---|---|---|---|---|---|
| DLC COATING SURFACE ROUGHNESS (Ra: $\mu$m) | 0.307 | 0.412 | 0.46 | 0.438 | 0.33 | 0.493 | 1.071 |
| DURABILITY (NUMBER OF CYCLES) | 120000 | 120000 | 120000 | 120000 | 120000 | 120000 | 30000 |

US 7,497,783 B2

PROPELLER SHAFT

This nonprovisional application is based on Japanese Patent Application No. 2005-379125 filed with the Japan Patent Office on Dec. 28, 2005, the entire contents of which are hereby incorporated by reference.

FIELD OF THE INVENTION

The present invention relates to a propeller shaft, and more particularly to a propeller shaft in which a spline shaft portion and a spline sleeve portion mesh with each other and perform frictional sliding with respect to each other.

DESCRIPTION OF THE BACKGROUND ART

Conventionally, for example, Japanese Patent Laying-Open Nos. 09-105419 (Patent Document 1) and 08-109918 (Patent Document 2) disclose a propeller shaft.

Patent Document 1 discloses a technique to apply a resin coating to a spline portion. As the spline portion is strongly affected by a surface of a counterpart sliding member, it is difficult to obtain desired friction characteristics with the resin coating. Namely, it is difficult to make a coefficient of static friction and a coefficient of dynamic friction substantially equal to each other.

Patent Document 2 discloses a technique to apply a plastic coating to a spline portion, however, desired friction characteristics cannot be obtained either.

SUMMARY OF THE INVENTION

The present invention was made to solve the above-described problems. An object of the present invention is to provide a propeller shaft capable of making a coefficient of static friction and a coefficient of dynamic friction substantially equal to each other and suppressing wear.

A propeller shaft according to the present invention includes a spline shaft and a spline sleeve meshing with each other and making sliding movement with respect to each other, and a diamond like carbon (DLC) coating provided on a sliding surface of at least one of the spline shaft and the spline sleeve. The DLC coating has surface roughness Ra of at most 0.5 μm.

In the propeller shaft structured as above, the DLC coating hard and excellent in wear resistance is provided on the sliding surface. Accordingly, desired friction characteristics in the propeller shaft spline portion can be obtained and wear can be suppressed. Therefore, by achieving desired friction characteristics, noise due to extension and contraction of the propeller shaft at the time when vehicle stops and starts can be reduced.

Further preferably, the DLC coating is applied only to the spline shaft side. In this case, as the DLC coating is formed on an outer circumferential surface of the shaft, forming of the DLC coating is easier than when it is formed on an inner circumferential surface of the sleeve.

More preferably, the DLC coating has a thickness in a range from at least 2 μm to at most 6 μm.

According to the present invention, a propeller shaft capable of reducing vibration and noise and sustaining an effect of such reduction by suppression of wear can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
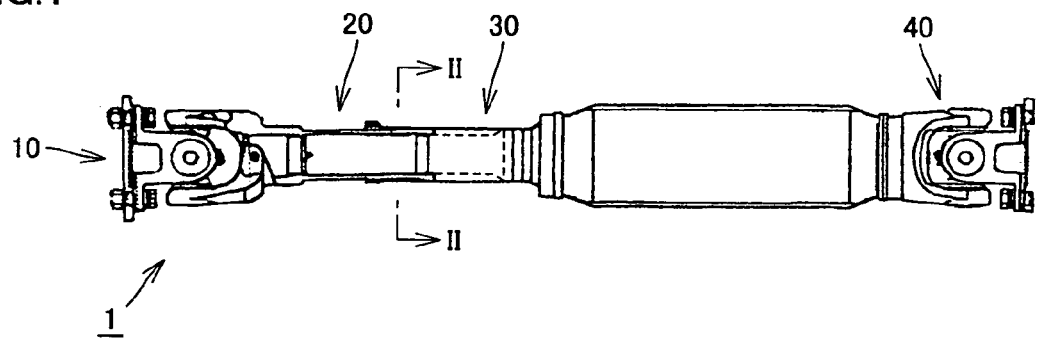
FIG. 1 is a cross-sectional view of a propeller shaft according to a first embodiment of the present invention.

An embodiment of the present invention will be described hereinafter with reference to the drawings. In the embodiment below, as the same or corresponding elements have the same reference characters allotted, detailed description thereof will not be repeated.

Figure 2:
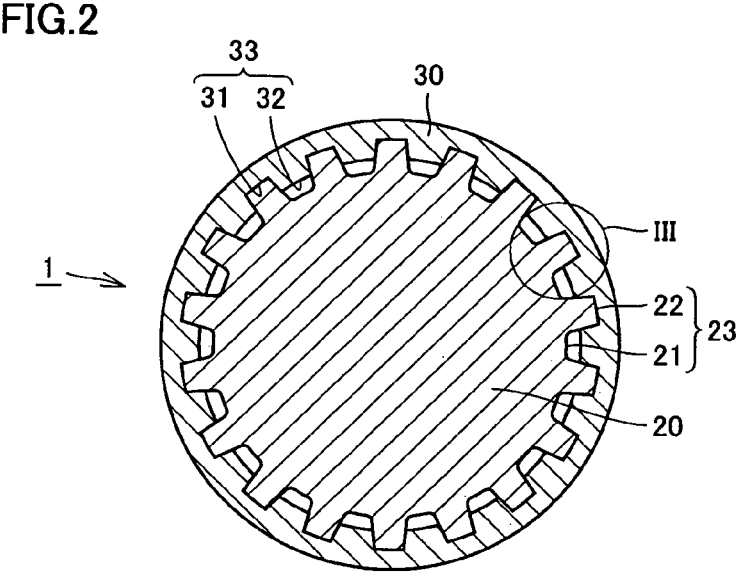
FIG. 2 is a cross-sectional view along the line II-II in FIG. 1.

FIG. 1 is a cross-sectional view of a propeller shaft according to a first embodiment of the present invention. FIG. 2 is a cross-sectional view along the line II-II in FIG. 1. Referring to FIGS. 1 and 2, a propeller shaft 1 according to the first embodiment of the present invention has universal joints 10, 40 provided on left and right ends respectively, a spline shaft 20 connected to universal joint 10, and a spline sleeve 30 meshing with spline shaft 20. Spline sleeve 30 moves in a longitudinal direction with respect to spline shaft 20, so that the total length of propeller shaft 1 extends or contracts. As shown in FIG. 2, spline sleeve 30 has a hollow cylindrical shape, and splines 33 formed by a recessed portion 31 and a projected portion 32 are formed on an inner circumferential surface. A plurality of splines 33 extend in parallel to each other in the longitudinal direction.

Spline shaft 20 has a cylindrical shape, and splines 23 formed by a recessed portion 21 and a projected portion 22 are provided on an outer circumferential surface. Spline 23 of spline shaft 20 meshes with spline 33 of spline sleeve 30, and spline sleeve 30 can slide with respect to spline shaft 20 in the longitudinal direction. In the embodiment shown in FIG. 2, the number of splines 23 of spline shaft 20 is equal to the number of splines 33 of spline sleeve 30. The embodiment, however, is not limited as such, and some projected portions 22 may not be provided. Specifically, the number of projected portions 22 of spline shaft 20 may be smaller than the number of recessed portions 31 of spline sleeve 30.

Figure 3:
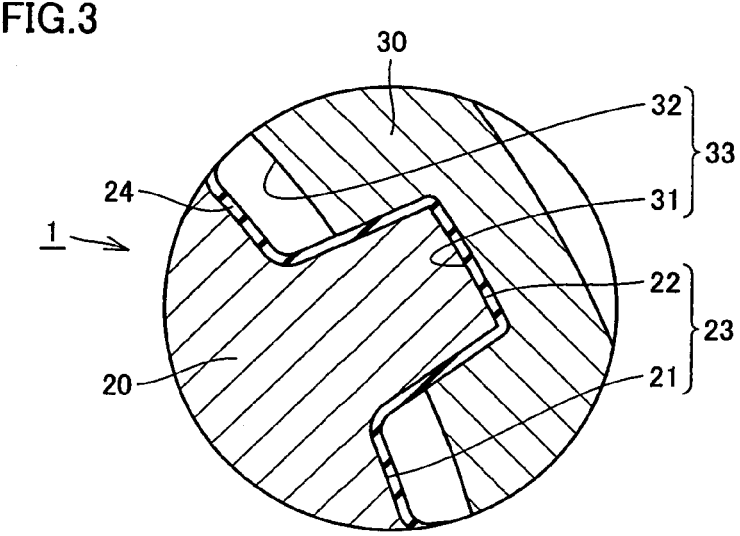
FIG. 3 is an enlarged cross-sectional view of a portion III encircled in FIG. 2.

FIG. 3 is an enlarged cross-sectional view of a portion III encircled in FIG. 2. Referring to FIG. 3, a DLC coating 24 is applied to the surface of spline 23 provided on the outer circumferential surface of spline shaft 20. DLC coating 24 is formed from a carbon material. DLC coating 24 has high hardness similar to that of diamond as well as electrical insulation characteristic. DLC coating 24 is mainly composed of carbon and has an amorphous structure containing a small amount of hydrogen. In DLC coating 24, diamond bond (covalent bond) and graphite bond (intermolecular bond) are present in a mixed manner.

DLC coating 24 may be manufactured in the following manner. Specifically, a hydrocarbon gas such as benzene is introduced in a vacuum chamber, the gas is turned to plasma by using direct current arc discharge so as to generate hydrocarbon ions, and the ions are caused to collide with a treated object, thus forming a film. As a DLC film has an amorphous structure, there is no grain boundary. The DLC film has a surface smoother than a crystalline material. Preferably, a temperature for forming DLC coating 24 is set to approximately 200° C. or lower.

In addition, preferably, DLC coating 24 has a thickness in a range from at least 2 μm to at most 6 μm. If the thickness is equal to or smaller than 2 μm, the advantage of coating with DLC coating 24 (smaller coefficient of static friction) is less. If the thickness of DLC coating 24 exceeds 6 μm, DLC coating 24 may peel off.

DLC coating 24 has surface roughness Ra of at most 0.5 μm. By setting surface roughness Ra of DLC coating 24 to 0.5 μm or smaller, better wear characteristic can be obtained. Grease is used for lubrication of DLC coating 24. Lithium soap grease containing a sulfur (S)- and phosphorous (P)-based additive is employed as the grease. Thus, the coefficient of static friction can be equal to or smaller than the coefficient of dynamic friction in the relation between friction coefficients at the time of spline sliding. A method of manufacturing spline shaft 20 will now be described.

Figure 4:
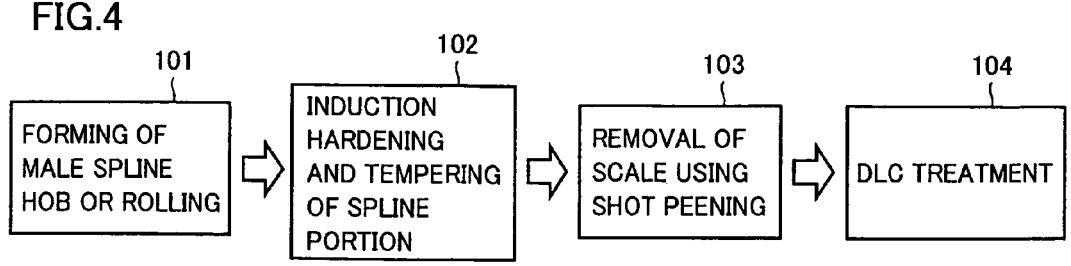
FIG. 4 is a flowchart showing a method of manufacturing a spline shaft according to the present invention.

FIG. 4 is a flowchart showing a method of manufacturing the spline shaft according to the present invention. According to step 101 in FIG. 4, spline 23 (male spline) is formed on the outer circumferential surface of spline shaft 20. Here, the forming method includes cutting using a hob and rolling in which spline shaft 20 is rolled with respect to a rack-type mold having corresponding teeth formed.

According to step 102, spline 23 is subjected to induction hardening and tempering. Strength can thus be improved.

According to step 103, spline 23 is subjected to shot peening for removing scales.

Finally, according to step 104, the DLC coating is applied to the surface of spline 23.

Figure 5:
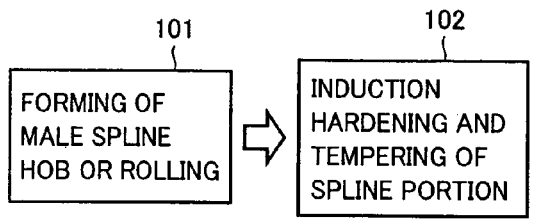
FIG. 5 illustrates a method of manufacturing a spline shaft according to a background art.

FIG. 5 illustrates a method of manufacturing a spline shaft according to a background art. Referring to FIG. 5, in a background art, after the male spline is formed in step 101, induction hardening and tempering of the spline portion is performed in step 102, and then the manufacturing ends. Namely, shot peening and DLC treatment are not performed.

Figure 6:
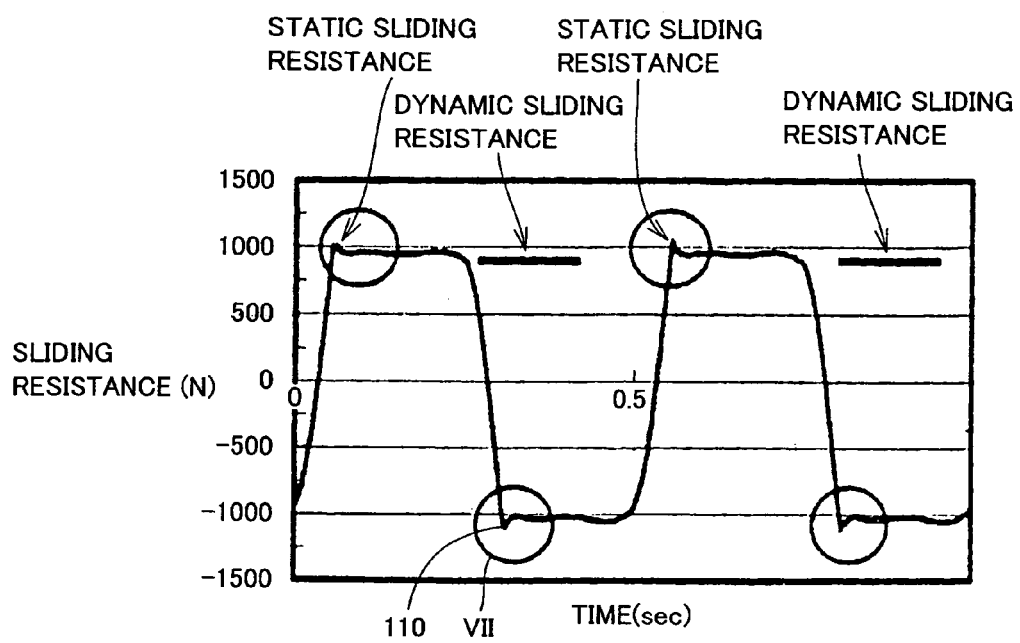
FIG. 6 is a graph showing a sliding characteristic of the propeller shaft according to the present invention.

FIG. 6 is a graph showing a sliding characteristic of the propeller shaft according to the present invention. In FIG. 6, the abscissa represents time and the ordinate represents sliding resistance. When twisting torque is applied to spline shaft 20, friction is caused between spline 23 of spline shaft 20 and spline 33 of spline sleeve 30. When propeller shaft 1 is caused to extend and contract in an axial direction in this state, sliding resistance is generated. When such sliding movement is continued in a reciprocating manner, in the case of the product of the present invention, a sliding resistance value as shown in FIG. 6 is obtained. A state where the "sliding resistance" is "0" in FIG. 6 indicates a state that spline shaft 20 stops with respect to spline sleeve 30. In contrast, in a region where the sliding resistance is greater than 0, any one of a state where spline shaft 20 moves toward spline sleeve 30 and a state where spline shaft 20 moves away from spline sleeve 30 is set, and in a region where sliding resistance is smaller than 0, the other state thereof is set. In other words, in the region where the sliding resistance has a value other than 0, spline shaft 20 moves with respect to spline sleeve 30. In the case of the product of the present invention, pulse-like sliding resistance values are obtained over time as shown in FIG. 6. A circled portion in FIG. 6 represents static sliding resistance, and other flat portions represent dynamic sliding resistance. In the present invention, it can be seen that the static sliding resistance is substantially equal to the dynamic sliding resistance.

Figure 7:
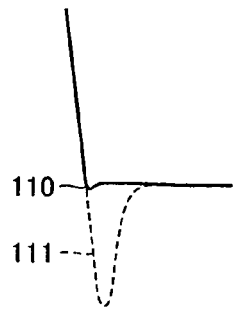
FIG. 7 is an enlarged view of a portion VII encircled in FIG. 6.

FIG. 7 is an enlarged view of a portion VII encircled in FIG. 6. Referring to FIG. 7, a solid line represents the sliding resistance in the product of the present invention, and a dotted line represents the sliding resistance in a comparative product (without the DLC coating). Protrusion 110 in the case of the product of the present invention shown in FIG. 7 is small, while protrusion 111 in the case of the conventional product shown with the dotted line is great. This indicates that the static sliding resistance is great in the conventional product, whereas the static sliding resistance is reduced in the product of the present invention. In propeller shaft 1 of an intermediate-portion-sliding type shown in FIGS. 1 to 3, an attitude of a vehicle changes when the vehicle restarts after it stops using the brake from a running state. When the attitude of the vehicle changes, the length of propeller shaft 1 changes, which results in occurrence of slip of splines 23, 33 forming the intermediate slide portion. Here, stick-slip vibration occurs due to the friction characteristic of the sliding portion, which causes unusual sound and vibration. In the present invention, the sliding portion formed by splines 23, 33 is coated with DLC coating 24, in order to make the coefficient of static friction equal to or smaller than the coefficient of dynamic friction. Thus, the friction characteristic is improved and unusual sound and vibration are reduced. As shown in FIG. 7, according to the present invention, protrusion 110 is small, and therefore the static sliding resistance in a stationary state is small. Consequently, transition from the stationary state to a moving state can readily be made, and occurrence of vibration that has conventionally been caused can be suppressed.

Figure 8:
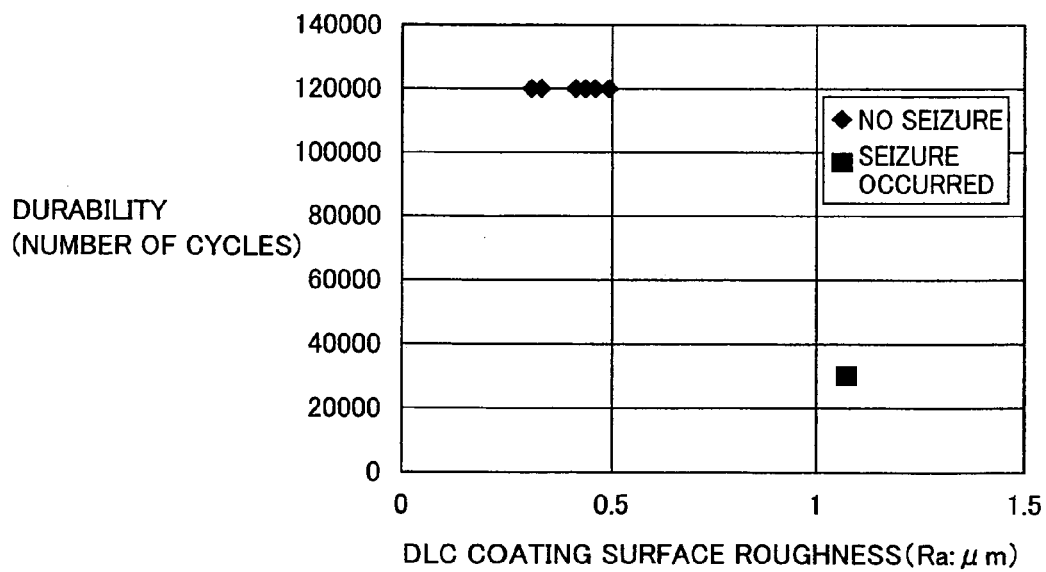
FIG. 8 is a table and a graph showing the number of cycles indicating durability in a sample according to the present invention and a sample of a comparative product.

FIG. 8 is a table and a graph showing the number of cycles indicating durability in a sample according to the present invention and a sample according to a comparative product. Initially, propeller shaft 1 in a shape as shown in FIGS. 1 to 3 was prepared. Spline sleeve 30 was fixed, twisting torque was applied to spline shaft 20 to cause spline shaft 20 to carry out reciprocating motion in a prescribed stroke, and the number of cycles until DLC coating 24 peels off was counted. As shown in the table in FIG. 8, surface roughness of DLC coating 24 was various among samples 1 to 7. It is noted that surface roughness Ra was measured using a high-precision surface roughness measuring instrument (product model number SE3400) manufactured by Kosaka Laboratory Ltd., complying with JIS standard B0601 (1994). A stylus having a tip radius of 5 μm was used.

In addition, conditions for the test were as follows.

Twisting torque: 50N·m

Spline shaft outer diameter: 33.3 mm

Spline sleeve inner diameter: 29.6 mm

DLC coating thickness: 2.7 to 4.4 μm

Stroke: ±10 mm

The number of times of reciprocating motion per minute: 150

As shown in FIG. 8, it can be seen that particularly excellent durability is obtained if the DLC coating has surface roughness not larger than 0.5 μm.

Figure 9:
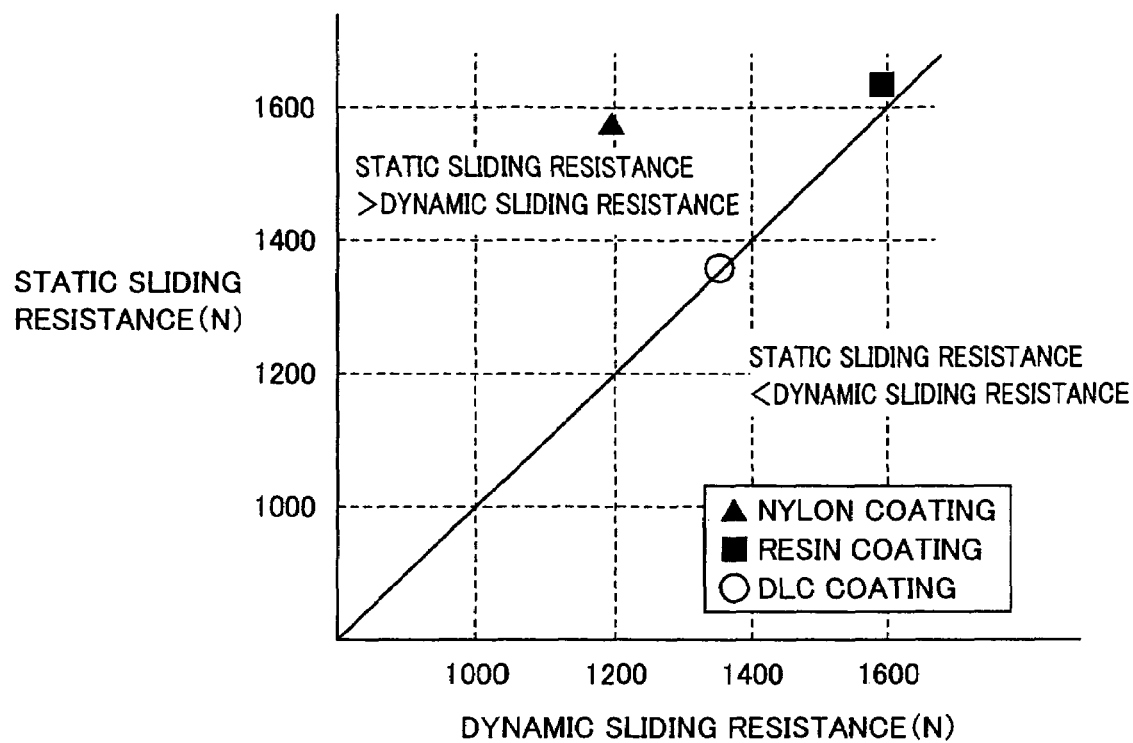
FIG. 9 is a graph showing comparison of friction performance between the product of the present invention and a conventional product.

FIG. 9 is a graph showing comparison of friction performance between the product of the present invention and the conventional product. It can be seen from FIG. 9 that the dynamic sliding resistance and the static sliding resistance of the DLC coating are substantially equal to each other. The "nylon coating" in FIG. 9 is a coating using nylon 77, and its static sliding resistance is greater than its dynamic sliding resistance because of material characteristic of nylon 77. The nylon coating represents the comparative product obtained by employing nylon 77 instead of DLC coating 24 shown in FIG. 3 for coating. The "resin coating" is a coating obtained by replacing DLC coating 24 in FIG. 3 with a resin coat. The resin coating is formed by applying and calcining a mixture of molybdenum disulfide and Teflon (™) containing an epoxy resin as a binder, and the static sliding resistance of this sample is again greater than the dynamic sliding resistance. Namely, it can be seen that the static sliding resistance is greater than the dynamic sliding resistance in various types of surface treatment for the comparative product.

In the comparative product, surface hardness of the coating layer is the surface hardness of the resin, which is lower than the surface hardness of metal. If such a soft coating is applied to the spline of the propeller shaft, the soft coating should slide with respect to a metal member, and restrictions in terms of a forming and treatment method are imposed, which results in higher surface roughness of the soft coating. If the metal having high surface roughness slides with respect to the resin coating, small projections on the metal surface stick into the resin coating layer. Then, original friction characteristics of a solid lubricant cannot be exhibited, and the coefficient of static friction becomes greater than the coefficient of dynamic friction. In contrast, as the hard DLC coating is used in the present invention, small metal projections can be prevented from sticking into DLC coating 24, and the coefficient of static friction can substantially be equal to the coefficient of dynamic friction.

In summary, propeller shaft 1 according to the present invention has spline shaft 20 serving as the external spline and spline sleeve 30 serving as the internal spline that mesh with each other, and DLC coating 24 having surface roughness Ra of 0.5 μm or smaller is applied to at least one of them. Though DLC coating 24 is applied to spline shaft 20 in the present embodiment, DLC coating 24 may be applied to spline 33 of spline sleeve 30 instead. Alternatively, DLC coating 24 may be applied to both of spline 23 of spline shaft 20 and spline 33 of spline sleeve 30.

Although the present invention has been described and illustrated in detail, it is clearly understood that the same is by way of illustration and example only and is not to be taken by way of limitation, the spirit and scope of the present invention being limited only by the terms of the appended claims.

The present invention can be used, for example, in the field of the propeller shaft mounted on a vehicle.

What is claimed is:

1. A propeller shaft comprising:
   a spline shaft and a spline sleeve meshing with each other and making sliding movement with respect to each other; and
   a diamondlike carbon (DLC) coating provided on a sliding surface of at least one of said spline shaft and said spline sleeve; and
   said DLC coating having surface roughness Ra of at most 0.5 μm.;
   wherein the spline shaft and the spline sleeve contain a metal, and a surface of the metal is coated with the DLC coating.

2. The propeller shaft according to claim 1, wherein said DLC coating is applied only to a side of said spline shaft.

3. The propeller shaft according to claim 1, wherein said DLC coating has a thickness in a range from at least 2 μm to at most 6 μm.

4. The propeller shaft according to claim 1, wherein said DLC coating is lubricated with grease.

5. The propeller shaft according to claim 1, wherein said DLC coating has an amorphous structure.

6. The propeller shaft according to claim 1, wherein said DLC coating is mainly composed of carbon.

7. The propeller shaft according to claim 1, wherein a static coefficient of friction of said sliding surface is substantially equal to or less than a dynamic coefficient of friction of said sliding surface.

8. The propeller shaft according to claim 1, wherein a static coefficient of friction of said sliding surface is substantially equal to a dynamic coefficient of friction of said sliding surface.

9. The propeller shaft according to claim 1, wherein the spline, which has been subjected to hardening and tempering, is coated with the DLC coating.

10. The propeller shaft according to claim 1, wherein the DLC coating consists of carbon and hydrogen.

* * * * *